(12) United States Patent
Onishi et al.

(10) Patent No.: US 7,689,029 B2
(45) Date of Patent: Mar. 30, 2010

(54) APPARATUS AND METHOD FOR INSPECTING PATTERN

(75) Inventors: Hiroyuki Onishi, Kyoto (JP); Hiroshi Asai, Kyoto (JP); Hiroshi Ogi, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 1219 days.

(21) Appl. No.: 11/235,288

(22) Filed: Sep. 27, 2005

(65) Prior Publication Data

US 2006/0067570 A1    Mar. 30, 2006

(30) Foreign Application Priority Data

Sep. 29, 2004    (JP) .................... P2004-283003

(51) Int. Cl.
G06K 9/00    (2006.01)
(52) U.S. Cl. .............. 382/149; 382/144; 382/145; 382/147
(58) Field of Classification Search ............ 382/141, 382/144–145, 147, 149
See application file for complete search history.

(56) References Cited

U.S. PATENT DOCUMENTS

| | | | | |
|---|---|---|---|---|
| 5,129,009 | A | * | 7/1992 | Lebeau .................. 382/149 |
| 5,544,256 | A | * | 8/1996 | Brecher et al. .......... 382/149 |
| 5,640,200 | A | * | 6/1997 | Michael .................. 348/87 |
| 5,699,447 | A | * | 12/1997 | Alumot et al. .......... 382/145 |
| 5,801,965 | A | * | 9/1998 | Takagi et al. ........... 702/35 |
| 5,943,437 | A | * | 8/1999 | Sumie et al. ............ 382/149 |
| 5,982,921 | A | * | 11/1999 | Alumot et al. .......... 382/145 |
| 6,122,397 | A | * | 9/2000 | Lee et al. ............... 382/149 |
| 6,205,239 | B1 | * | 3/2001 | Lin et al. ............... 382/149 |
| 6,865,288 | B1 | * | 3/2005 | Shishido et al. ......... 382/145 |

(Continued)

FOREIGN PATENT DOCUMENTS

JP    59-192944    11/1984

(Continued)

OTHER PUBLICATIONS

Kurita, T. et al. "A new scheme for practical flexible and intelligent vision systems." IAPR Workshop on Computer Vision, Special Hardware and Industrial Applications, Tokyo, Oct. 12-14, 1998. pp. 431-435.

*Primary Examiner*—Bhavesh M Mehta
*Assistant Examiner*—Gandhi Thirugnanam
(74) *Attorney, Agent, or Firm*—McDermott Will & Emery LLP

(57) ABSTRACT

An operation part in a pattern inspection apparatus includes a defect candidate image generator for generating a binary defect candidate image representing a defect candidate area in an inspection image by comparing the inspection image with a reference image, in an inspection image masking part the inspection image is masked with the defect candidate image to obtain a masked inspection image. In a feature value calculation part, an autocorrelation feature value is obtained from the masked inspection image, and outputted to a classifying part. The classifying part comprises a classifier outputting a classification result on the basis of the autocorrelation feature value and a classifier construction part for constructing the classifier by learning. It is thereby possible to easily perform the high accurate classification of defect candidate using the autocorrelation feature value which is hard to characterize as compared with geometric feature value or feature value representing density.

4 Claims, 11 Drawing Sheets

U.S. PATENT DOCUMENTS

| | | |
|---|---|---|
| 6,868,175 B1 * | 3/2005 | Yamamoto et al. ............ 382/145 |
| 7,162,073 B1 * | 1/2007 | Akgul et al. ................. 382/149 |
| 2003/0228049 A1 | 12/2003 | Asai |
| 2004/0133369 A1 * | 7/2004 | Pack et al. ..................... 702/59 |
| 2004/0218807 A1 * | 11/2004 | Alumot et al. ............... 382/149 |
| 2006/0034505 A1 * | 2/2006 | Luk-Pat et al. .............. 382/144 |
| 2006/0067570 A1 * | 3/2006 | Onishi et al. ................. 382/147 |
| 2006/0078191 A1 * | 4/2006 | Matsumura ................. 382/149 |
| 2006/0126916 A1 * | 6/2006 | Kokumai ..................... 382/151 |
| 2007/0133860 A1 * | 6/2007 | Lin et al. ..................... 382/149 |

FOREIGN PATENT DOCUMENTS

| | | |
|---|---|---|
| JP | 5-013256 | 2/1993 |
| JP | 59-192944 | 11/1994 |
| JP | 8-021803 | 1/1996 |
| JP | 8-21803 | 1/1996 |
| JP | 9-186208 | 7/1997 |
| JP | 2001-99625 | 4/2001 |
| JP | 2001-99625 A | 4/2001 |
| JP | 2002-022421 | 1/2002 |
| JP | 2002-22421 A | 1/2002 |
| JP | 2004-12422 | 1/2004 |
| JP | 2004-085503 | 3/2004 |
| JP | 2004-101214 | 4/2004 |

* cited by examiner

F I G. 1
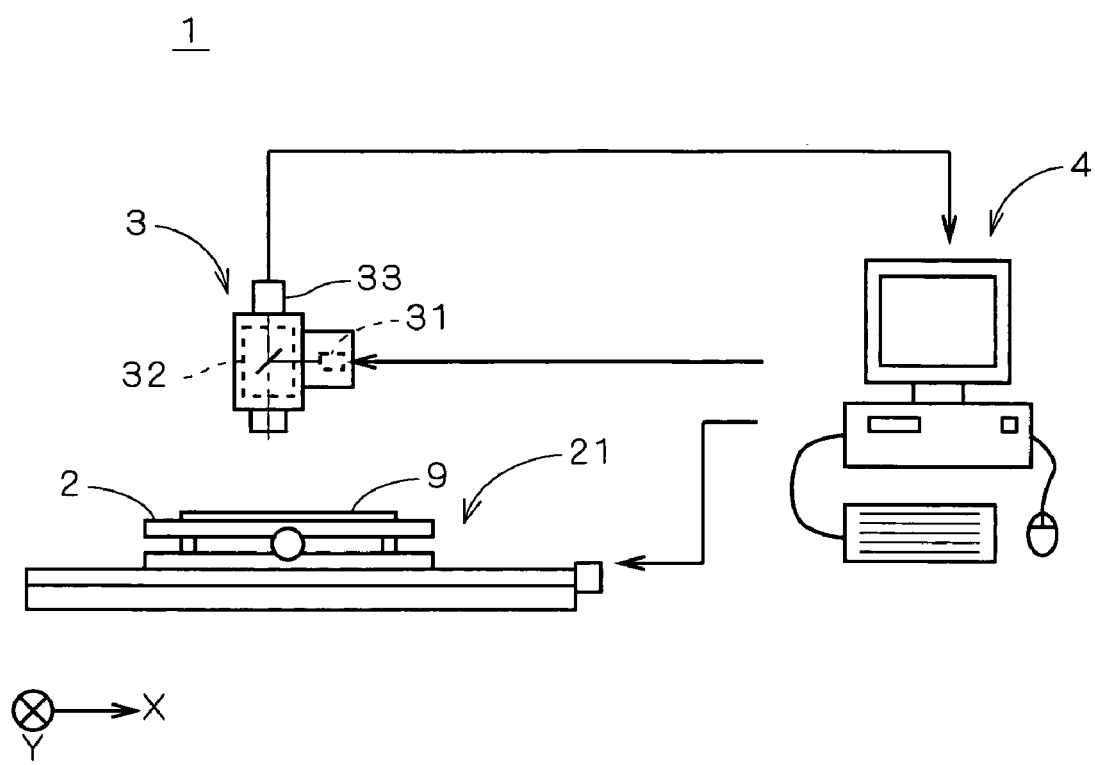

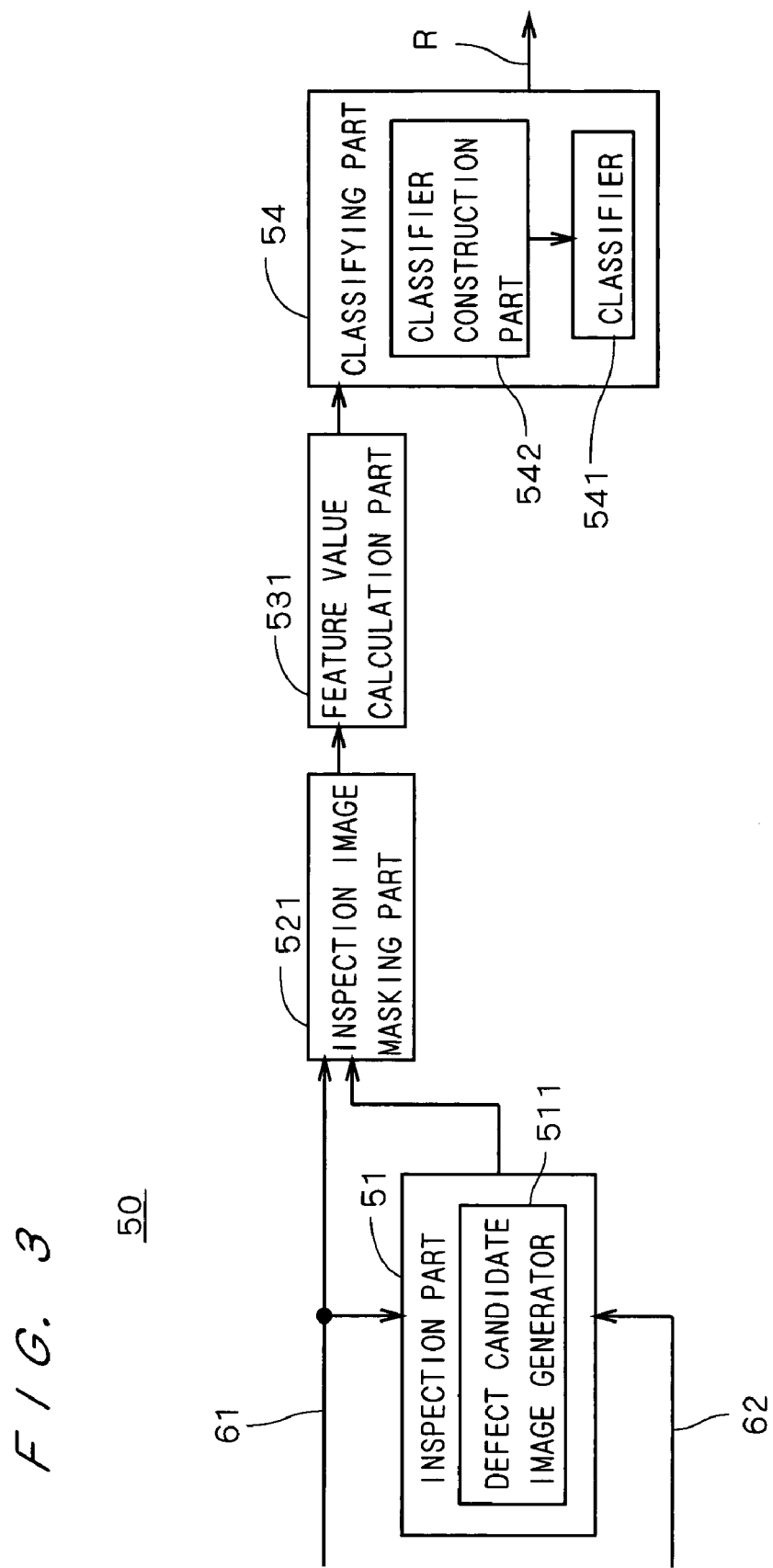
F I G. 3

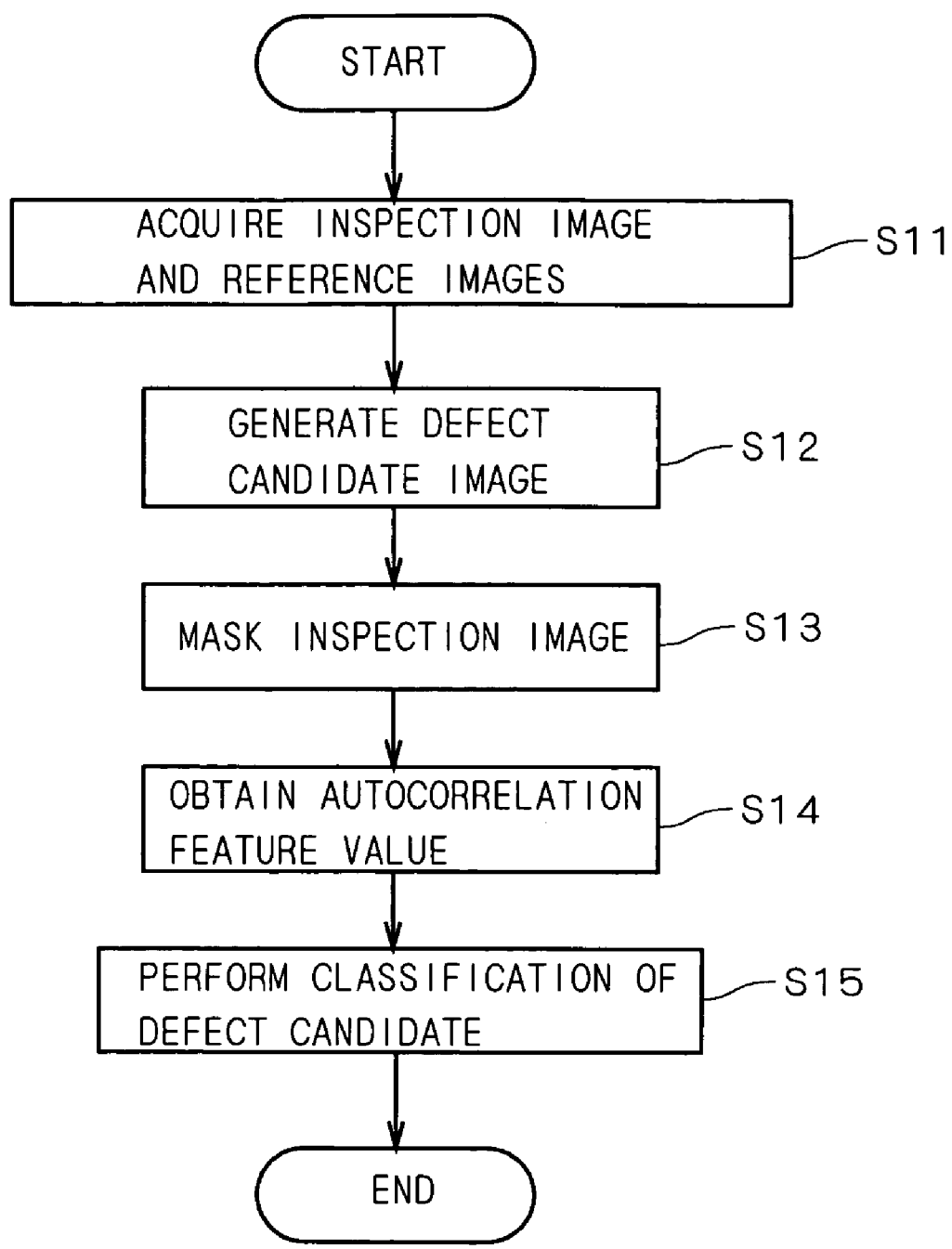
F I G. 4

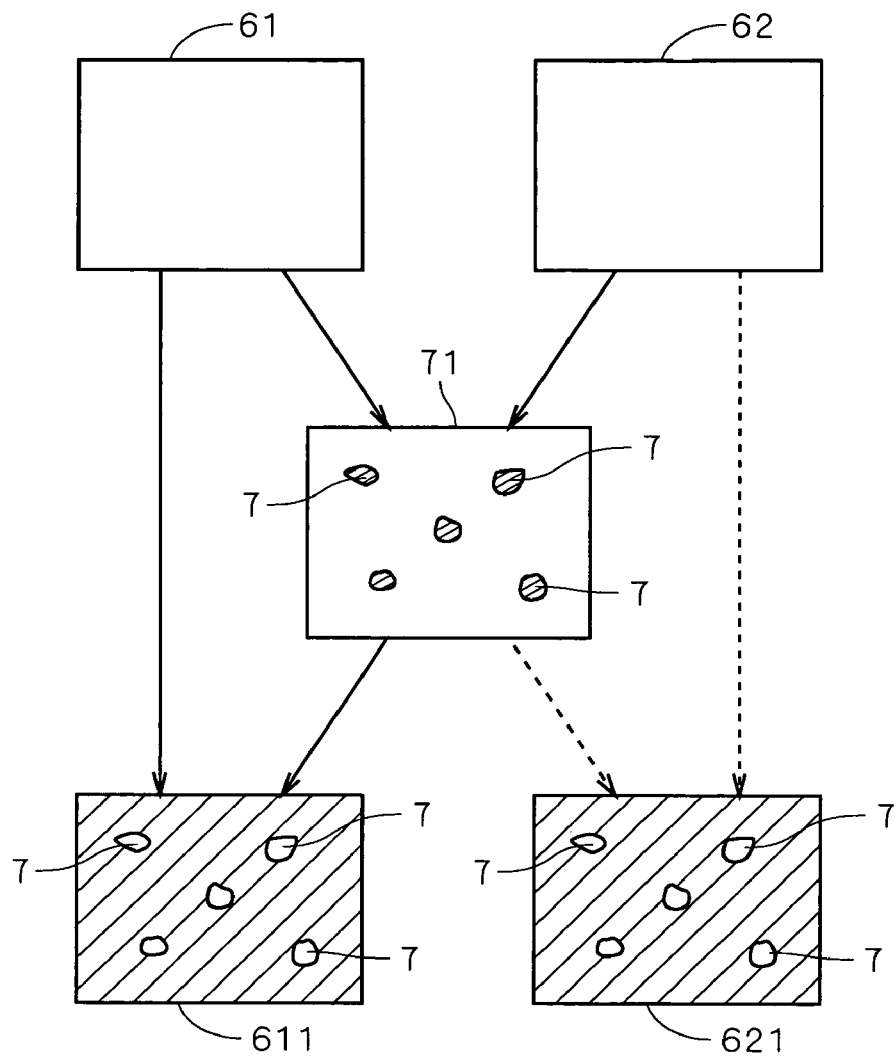

81A

| 0 | 0 | 0 |
|---|---|---|
| 0 | 1 | 1 |
| 0 | 0 | 0 |

81B

| 0 | 0 | 1 |
|---|---|---|
| 0 | 1 | 0 |
| 0 | 0 | 0 |

81C

| 1 | 0 | 0 |
|---|---|---|
| 0 | 1 | 0 |
| 0 | 0 | 0 |

…
APPARATUS AND METHOD FOR INSPECTING PATTERN

BACKGROUND OF THE INVENTION

1. Field of the Invention

The present invention relates to a technique for inspecting pattern on an object.

2. Description of the Background Art

A comparison check method has been mainly used, conventionally, in a field of inspection of pattern formed on a semiconductor substrate, a glass substrate, a printed circuit board or the like. For example, in binary image, an image of exclusive OR of an inspection image (an image to be inspected) and a reference image is obtained, and in grayscale image, an absolute difference value image which represents absolute values of the difference between pixel values in an inspection image and pixel values in a reference image is obtained and each pixel is binarized by a predetermined threshold value, to detect an area of a defect.

In the circuit formation process or the like of a semiconductor substrate, a pattern inspection apparatus with a function to classify a class of a detected defect automatically (i.e., to classify a defect automatically) is used to specify the cause of a low yield and improve manufacturing conditions in each operation. In general, classification of a defect is performed in accordance with classification conditions given by a user in advance (on a so-called rule base) or by using a method based on learning such as discriminant analysis or neural network on the basis of a feature value obtained from an area in an inspection image or a reference image corresponding to a defect.

Japanese Examined Patent Application Laid Open Gazette No. 5-13256 (Document 1) discloses a method where a binary image which represents defects is divided into partial areas by using a reference image divided into areas and a feature value of the defect is obtained in each partial area, to classify a class of the defect on a rule base. Japanese Patent Application Laid Open Gazette No. 9-186208 (Document 2) suggests a method where a grayscale inspection image is separated into a wire portion and a background portion, and a feature value representing density of defect is acquired in each portion, to classify the defect on the basis of the feature value. Japanese Patent Application Laid Open Gazette No. 8-21803 (Document 3) discloses a method where geometric feature values such as an area (i.e., the number of pixels), length of circumference, feret diameter, roundness, centroid position are mainly obtained and inputted to neural network, to perform a high-level classification of a defect.

Japanese Patent Application Laid Open Gazette No. 2001-99625 (Document 4) suggests a method where average density, an autocorrelation feature value or the like of an area in an inspection image or a reference image corresponding to a specified defect candidate is obtained, to classify whether the defect candidate is true or false on a rule base. Japanese Patent Application Laid Open Gazette No. 2002-22421 (Document 5) discloses a technique where two differential images between an inspection image and two reference images are generated, values of pixels in the two differential images are converted into error probability values by using a standard deviation of the pixel values to generate two error probability value images. Further, products of the values of corresponding pixels in the two error probability value images are obtained to generate a probability product image, and value of each pixel in the probability product image is compared with a predetermined threshold value to determine whether there is a defect or not on an object.

Recently, it is required to increase the accuracy of classification of defects, however, even if geometric feature values or feature values representing density are obtained as the methods disclosed in Documents 1 or 3, it is difficult to classify classes of defects with high accuracy in some cases. In this case, even if the method based on leaning such as neural network in Document 3 is used, since the accuracy of classification largely depends on a type of inputted feature value in general, it is not possible to meet the required accuracy.

On the contrary, by applying the method of Document 4 obtaining an autocorrelation feature value to classification of defects, it is expected to classify with certain accuracy, but depending on an object to be inspected, it is needed to increase the accuracy of classification. To classify by using an autocorrelation feature value on a rule base, normally, it needs to determine classification conditions by complicated operation. Thus, it is not possible to perform a classification of defects easily.

SUMMARY OF THE INVENTION

The present invention is intended for an apparatus for inspecting pattern on an object. It is an object of the present invention to classify a class of a defect candidate of pattern on an object with high accuracy. It is another object of the present invention to perform a classification of a defect candidate easily.

The apparatus comprises a differential image generator for generating a differential image representing a difference between a grayscale inspection image representing pattern on an object and a grayscale reference image or a difference between two images obtained from the inspection image and the reference image, respectively, or a differential image obtained from an image representing the difference, a defect candidate image generator for generating a defect candidate image representing an area which includes a defect candidate in the inspection image by comparing the inspection image with the reference image, a differential image masking part for masking the differential image with the defect candidate image to obtain a masked differential image, a feature value calculation part for obtaining an autocorrelation feature value from the masked differential image and a classifying part for performing a classification of the defect candidate on the basis of the autocorrelation feature value.

According to the present invention, it is possible to classify a class of the defect candidate on the basis of the autocorrelation feature value with high accuracy.

According to one preferred embodiment of the present invention, the apparatus further comprises an inspection image masking part for masking the inspection image with the defect candidate image to obtain a masked inspection image, and in the apparatus, the classification is also based on an autocorrelation feature value obtained from the masked inspection image.

According to another preferred embodiment of the present invention, the apparatus further comprises a reference image masking part for masking the reference image with the defect candidate image to obtain a masked reference image, and in the apparatus, the classification is also based on an autocorrelation feature value obtained from the masked reference image.

According to still another preferred embodiment of the present invention, the classification is also based on an autocorrelation feature value obtained from the defect candidate image.

The other apparatus comprises a defect candidate image generator for generating a defect candidate image representing an area which includes a defect candidate in a grayscale inspection image representing pattern on an object by comparing the inspection image with a reference image, an inspection image masking part for masking the inspection image with the defect candidate image to obtain a masked inspection image, a feature value calculation part for obtaining an autocorrelation feature value from the masked inspection image and a classifying part for performing a classification of the defect candidate on the basis of the autocorrelation feature value, and in the apparatus, the classifying part comprises a classifier construction part for constructing a classifier by learning which outputs a classification result in accordance with the autocorrelation feature value. It is thereby possible to easily perform the high accurate classification of defect candidate.

The present invention is also intended for a method of inspecting pattern on an object.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view showing a construction of a pattern inspection apparatus;

FIG. 3 is a block diagram showing a structure of an operation part in accordance with a first preferred embodiment;

FIG. 4 is a flowchart showing an operation flow for inspecting pattern on a substrate;

FIG. 5 is a view showing a state where an inspection image and a reference image are masked;

FIG. 6 is a view illustrating an autocorrelation matrix;

DESCRIPTION OF THE PREFERRED EMBODIMENTS

Figure 2:
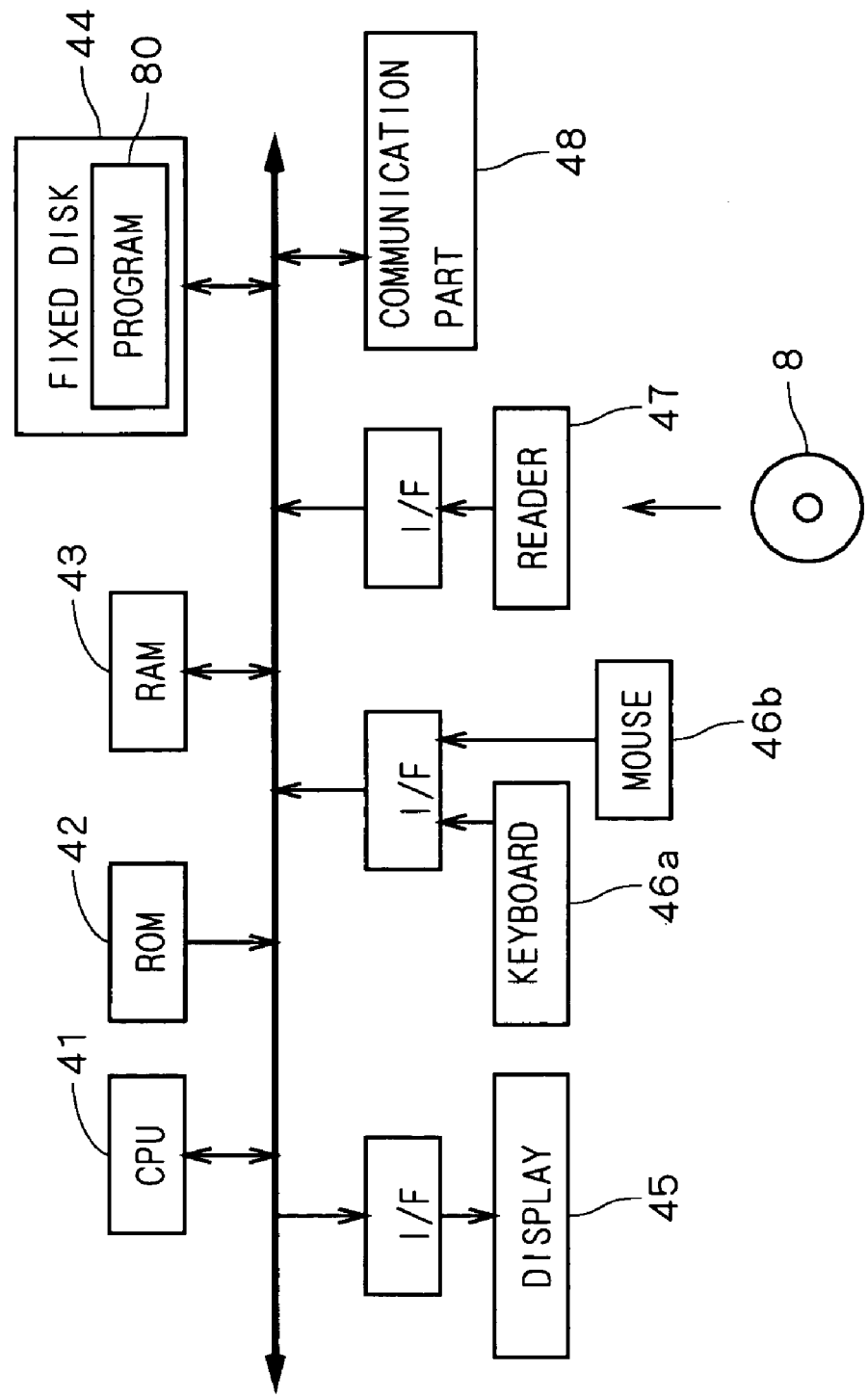
FIG. 2 is a block diagram showing a structure of a computer.

FIG. 1 is a view showing a construction of a pattern inspection apparatus 1 in accordance with the first preferred embodiment of the present invention. The pattern inspection apparatus 1 comprises a stage 2 for holding a semiconductor substrate (hereinafter, referred to as a "substrate") 9 formed predetermined wiring pattern, an image pickup part 3 for performing an image pickup of the substrate 9 to acquire a grayscale image of the substrate 9, a stage driving part 21 for moving the stage 2 relatively to the image pickup part 3 and a computer 4 constituted of a CPU which performs various computations and memories which store various information and the like. Each constituent element of the pattern inspection apparatus 1 is controlled by the computer 4.

The image pickup part 3 comprises a lighting part 31 for emitting an illumination light, an optical system 32 for guiding the illumination light to the substrate 9 and receiving the light from the substrate 9 and an image pickup device 33 for converting an image of the substrate 9 formed by the optical system 32 into an electrical signal, and an image data of the substrate 9 is outputted from the image pickup device 33. The stage driving part 21 has mechanisms for moving the stage 2 in the X direction and the Y direction of FIG. 1. Though the image is acquired by the image pickup part 3 with the illumination light which is a visible light in the first preferred embodiment, for example, an electron beam, an X-ray or the like may be used to acquire images.

FIG. 2 is a block diagram showing a structure of the computer 4. The computer 4 has a constitution of general computer system where a CPU 41 for performing various computations, a ROM 42 for storing a basic program and a RAM 43 for storing various information are connected to a bus line as shown in FIG. 2. To the bus line, a fixed disk 44 for storing information, a display 45 for displaying various information such as images, a keyboard 46a and a mouse 46b for receiving an input from a user, a reader 47 for reading information from a computer-readable recording medium 8 such as an optical disk, a magnetic disk, a magneto-optical disk, and a communication part 48 for transmitting and receiving a signal to/from other constituent elements in the pattern inspection apparatus 1 are further connected through an interface (I/F) or the like as appropriate.

A program 80 is read out from the recording medium 8 through the reader 47 into the computer 4 and stored into the fixed disk 44 in advance. The program 80 is copied to the RAM 43 and the CPU 41 executes computation in accordance with a program stored in the RAM 43 (in other words, the computer executes the program), and the computer 4 thereby serves as an operation part in the pattern inspection apparatus 1.

FIG. 3 is a block diagram showing a structure of functions implemented by the CPU 41, the ROM 42, the RAM 43, the fixed disk 44 and the like in an operation by the CPU 41 according to the program 80. In FIG. 3, each constituent (an inspection part 51, an inspection image masking part 521, a feature value calculation part 531 and a classifying part 54) of the operation part 50 is a function implemented by the CPU 41 and the like. These functions of the operation part 50 may be implemented by dedicated electric circuits, or may be partially implemented by dedicated electric circuits.

FIG. 4 is a flowchart showing an operation flow of the pattern inspection apparatus 1 for inspecting pattern on the substrate 9. In the pattern inspection apparatus 1, first, a predetermined inspection area (hereinafter, referred to as a "first inspection area") on the substrate 9 is moved to an image pickup position of the image pickup part 3 by the stage driving part 21 and an image of the first inspection area is acquired. Subsequently, a second inspection area which is located on the substrate 9, away from the first inspection area by a period of patterns (for example, a distance between centers of dies arranged on the substrate 9) and a third inspection area away from the second inspection area by the same distance as the period are subsequently adjusted to the image pickup position and images of the second inspection area and the third inspection area are thereby acquired (Step S11). In the first inspection area and the third inspection area on the substrate 9, the same pattern as that in the second inspection area is formed, and in the following operation, the image of the second inspection area serves as an inspection image (an image to be inspected) and the images of the first inspection area and the third inspection area serve as reference images. One inspection image and two reference images which are acquired thus are outputted to the operation part 50. In FIG. 3, arrows assigned reference signs 61 and 62 show signals representing one inspection image and two reference images, respectively. An image which can be acquired in advance by picking up an image of a substrate with no defect or an image which can be obtained from design data may be prepared as a reference image.

In a defect candidate image generator 511 in the inspection part 51, a defect candidate image representing areas (or an area) each of which includes a defect candidate(s) in the inspection image (hereinafter, referred to as a "defect candidate area") is generated from one inspection image and two reference images (Step S12). As a process for generating the defect candidate image, for example, the method of Japanese Patent Application Laid Open Gazette No. 2002-22421 (Document 5) can be used partially, and the disclosure of which is herein incorporated by reference. In this case, first, a first image which is a simple differential image representing absolute difference values between the inspection image and the reference image of the first inspection area and a second image which is a simple differential image representing absolute difference values between the inspection image and the reference image of the third inspection area are generated. Subsequently, a standard deviation of values of pixels of the first image is obtained and the value of each pixel in the first image is divided by the standard deviation, to generate a first error probability value image. Similarly, a standard deviation of values of pixels of the second image is obtained and the value of each pixel in the second image is divided by the standard deviation, to generate a second error probability value image.

After the two error probability value images are generated, one probability product image is generated by obtaining the square root of a product of value of each pixel in the first error probability value image and value of the corresponding pixel in the second error probability value image. The value of each pixel in the probability product image is compared with a predetermined threshold value, for example, "1" is assigned to pixels of values which are larger than the threshold value and "0" is assigned to pixels of values which are not larger than the threshold value, to binarize the probability product image. In the binarized probability product image, spatially continuously extending pixels of the value "1" are labeled as an area and dilation is performed on this area, to generate a binary defect candidate image representing defect candidate areas which include defect candidates.

The defect candidate image is not necessarily obtained by binarization of the probability product image, for example, a defect candidate image may be generated by binarizing an absolute difference value image by the predetermined threshold value which represents an absolute value of the difference between a value of each pixel of the inspection image and a value of the corresponding pixel of one reference image. In other words, a defect candidate image 71 representing defect candidate areas 7 may be generated by using various methods where the inspection image 61 is compared with the reference image 62 as conceptually shown in the upper and middle positions of FIG. 5. The defect candidate image is not needed to be a binary image.

After the defect candidate image 71 is generated, the inspection image 61 and the defect candidate image 71 are inputted to the inspection image masking part 521 and the inspection image 61 is masked with defect candidate image 71, to obtain a masked inspection image 611 (Step S13). With this operation, as shown in the left of lower position of FIG. 5, values of pixels included in each area in the inspection image 61 corresponding to the defect candidate area 7 (in the left of lower position of FIG. 5, the same reference sign 7 as the middle of FIG. 5 is assigned) do not change and values of pixels included in other areas change to, for example, "0". In the feature value calculation part 531, an autocorrelation feature value is obtained from the masked inspection image 611 (Step S14).

Discussion will be made on a basic method for obtaining an autocorrelation feature value. FIG. 6 is a view illustrating an exemplary autocorrelation matrix 81 used in obtaining an autocorrelation feature value. In the autocorrelation matrix 81 of FIG. 6, the elements are arranged in 3×3 (3 rows and 3 columns), where the value "1" is assigned to the center element and the element adjacent to the upper of this element and the value "0" is assigned to the other elements. In the feature value calculation part 531, the center element of the autocorrelation matrix 81 is overlapped to one pixel in the masked inspection image 611 (hereinafter, referred to as a "target pixel") which is an image to be operated, to obtain a product of values of pixels in the masked inspection image 611 corresponding to the elements of the value "1" in the autocorrelation matrix 81. Then, a new value of the target pixel is determined by dividing the obtained value by a predetermined value such as the average pixel value, the largest pixel value or the like of inspection image 611.

The above operation is subsequently performed to each pixel included in (an area corresponding to) each defect candidate area 7 in the masked inspection image 611 and the sum, the average or the like of new values of pixels included in one defect candidate area 7 is extracted as an autocorrelation feature value of the defect candidate area 7. At that time, since the image to be operated in the feature value calculation part 531 is masked with the defect candidate image, the feature value which is obtained is not affected by areas other than the defect candidate area 7. In the feature value calculation part 531, the autocorrelation feature value is obtained relative to only the defect candidate area 7, thus the efficiency of the operation can be increased. When the function of feature value calculation part 531 is implemented by electric circuits, the operation using the autocorrelation matrix 81 may be performed to all the pixels of the masked inspection image 611.

When the operation using the autocorrelation matrix 81 of FIG. 6 is performed to areas which represent longitudinally (i.e., in a column direction of arrangement of pixels) continuous pattern, the autocorrelation feature value becomes large, and when the operation is performed to areas which represent transversely (i.e., in a row direction of arrangement of pixels) continuous pattern, the autocorrelation feature value becomes small. Thus, the feature value which is obtained by the operation using the autocorrelation matrix 81 indicates a feature including geometric feature with directivity on a specific direction (longitudinal direction in the autocorrelation matrix 81 of FIG. 6).

Figures 7A, 7B, 7C, 8:
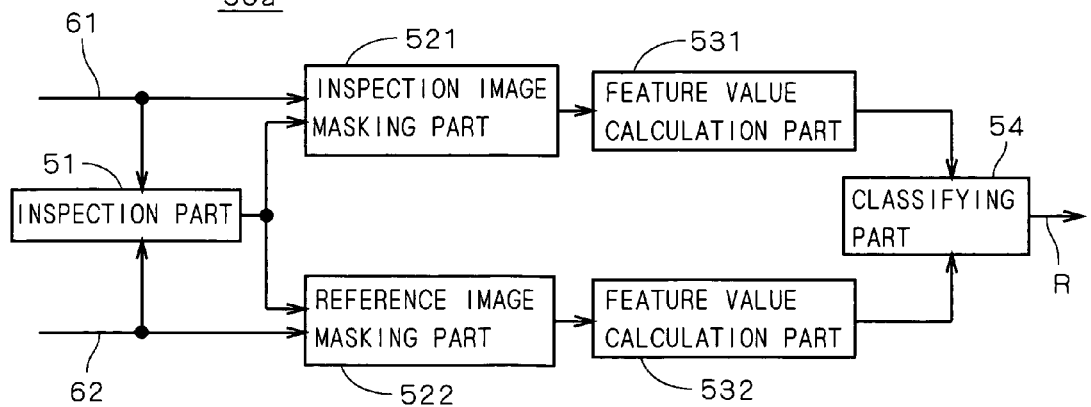
FIGS. 7A, 7B and 7C are views illustrating other examples of autocorrelation matrixes.
FIG. 8 is a block diagram showing another exemplary structure of an operation part.

FIGS. 7A, 7B and 7C may be used as other examples of autocorrelation matrixes. In the autocorrelation matrixes 81A, 81B and 81C of FIGS. 7A to 7C, an autocorrelation feature value which indicates a feature with the directivities on the directions of 0°, 45° and 135° transversely can be obtained, respectively.

Various kinds of autocorrelation matrixes combining some of the autocorrelation matrixes 81 and 81A to 81C or the like are known, and actually, some (or all) kinds of autocorrelation matrixes are selected according to features of pattern to be inspected or features of supposed defects, a plurality of autocorrelation matrixes are prepared, and then an autocorrelation feature value relative to each defect candidate area 7 is obtained as a high-dimensional vector of which values of elements are obtained by using the plurality of autocorrelation matrixes, respectively. Such an autocorrelation feature value can be used for a defect candidate having no geometric feature (for example, textured). In this case, for example, an autocorrelation feature value may be obtained after removing an effect in rotation of a defect candidate by mapping an inspection image to a Rθ plane.

The autocorrelation feature value is obtained in the feature value calculation part 531 related to each defect candidate area 7 and the autocorrelation value is outputted to the classifying part 54. The classifying part 54 comprises a classifier 541 which outputs a classification result in accordance with an input of an autocorrelation feature value and a classifier construction part 542 for constructing the classifier 541 by learning. The classifier construction part 542 uses discriminant analysis method, neural network, genetic algorithms or the like with creating training data. The classifier construction part 542 generates defect classification conditions corresponding to the classifier 541 by learning, and inputs the defect classification conditions to the classifier 541. In the classifying part 54, the autocorrelation feature value of each defect candidate area 7 is inputted to the classifier 541 and a classification result on a class of each defect candidate is outputted as a signal R according to the defect classification conditions. As mentioned above, the classification of defect candidate which is included in each defect candidate area 7 is performed on the basis of the autocorrelation feature value in the classifier 54 (Step S15). Then, the classification result is informed to a user if necessary. By taking a false defect (pseudo defect) as one of classes of defects, a defect candidate can be classified as the false defect.

As discussed above, in the pattern inspection apparatus 1, the inspection image 61 is masked with the defect candidate image 71 which represents the defect candidate area(s) 7 to obtain the autocorrelation feature value of the defect candidate area 7 from the masked inspection image 611. The autocorrelation feature value is inputted to the classifier 541 constructed in advance by learning and the defect candidate included in the defect candidate area 7 is classified automatically. In many cases, since autocorrelation feature value obtained by using a plurality of autocorrelation matrixes includes elemental features which are hardly grasped at the human vision, it is hard to characterize the autocorrelation feature value as compared with geometric feature value or feature value representing density. Therefore, it is difficult for a user to determine classification conditions for autocorrelation feature value in classifying on a so-called rule base. Conversely, in the pattern inspection apparatus 1, since the classifier 541 is constructed by learning and it outputs a classification result in accordance with an autocorrelation feature value, various classifications can be performed flexibly and the classification(s) of defect candidate(s) using autocorrelation feature(s) values can be performed easily with high accuracy.

In the feature value calculation part 531, other type(s) of a feature value(s) such as geometric feature value, feature value representing density in each defect candidate area 7 is further obtained and a classification of defect candidate may be performed together with the autocorrelation feature value with high accuracy. When it is important that a true defect is detected by classifying whether a defect candidate is true or false, it is preferable to make the threshold value small used in binarization of the probability product image or the simple differential image. By this operation, more defect candidate areas 7 are extracted and possibility for missing true defect is reduced. Also in this case, it is possible to reduce a probability of detecting a false defect by classifying on the basis of the autocorrelation feature value in the classifying part 54.

Figure 9:
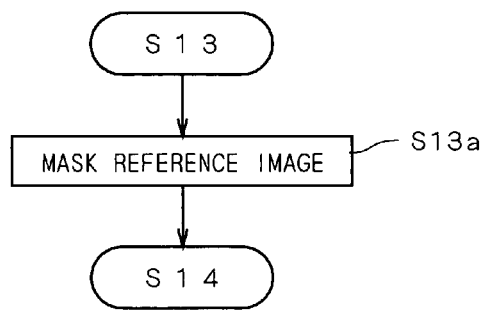
FIG. 9 is a flowchart showing part of an operation flow for inspecting pattern on a substrate.

FIG. 8 is a block diagram showing another exemplary structure of an operation part. FIG. 9 is a flowchart showing part of an operation flow for inspecting pattern on a substrate and the operation is performed between Step S13 and Step S14 of FIG. 4. An operation part 50a of FIG. 8, in comparison to the operation part 50 of FIG. 3, further comprises a reference image masking part 522 where signals of a reference image 62 and a defect candidate image 71 are inputted and a feature value calculation part 532 where a signal of a masked reference image 62 is inputted. Other constituent elements are the same as those described in the operation part 50 of FIG. 3 and are represented by the same reference signs.

In the operation part 50a, when the defect candidate image 71 is generated (FIG. 4: Step S12), concurrently with masking the inspection image 61 in the inspection image masking part 521 (Step S13), the reference image 62 (when two reference images are acquired, any one of reference images or one new reference image which is generated by calculating the average of values of corresponding pixels in the two reference images) is masked by the reference image masking part 522 with the defect candidate image 71, to obtain a masked reference image 621 as shown in the right of lower position of FIG. 5 (Step S13a). Then, an autocorrelation feature value of each defect candidate area 7 is obtained from the masked inspection image 611 and an autocorrelation feature value of each defect candidate area 7 is also obtained from the masked inspection image 621 (FIG. 4: Step S14). In the classifying part 54, the two autocorrelation feature values of each defect candidate area 7 obtained from the two masked images 611 and 612 are inputted to the classifier 541, to classify a class of defect candidate (Step S15).

As discussed above, in the operation part 50a of FIG. 8, the classification by the classifying part 54 is also based on the autocorrelation feature value obtained from the masked reference image 621 in addition to the autocorrelation feature value obtained from the masked reference image 611. As a result, in the pattern inspection apparatus 1 with the operation part 50a, it becomes possible to classify classes of defect candidates with high accuracy.

Figure 10:
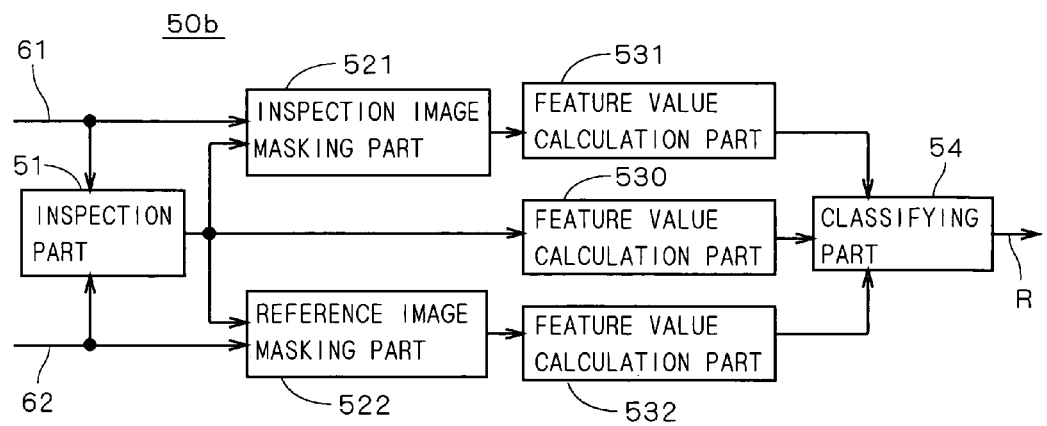
FIG. 10 is a block diagram showing still another exemplary structure of an operation part.

FIG. 10 is a block diagram showing still another exemplary structure of an operation part. An operation part 50b of FIG. 10 is a part added a feature value calculation part 530 to the operation part 50a of FIG. 8. In the operation part 50b, a defect candidate image which is generated in the inspection part 51 is outputted to the feature value calculation part 530. In Step S14 of FIG. 4, autocorrelation feature values of each defect candidate area are extracted from the defect candidate image, the masked inspection image and the masked reference image, respectively, in the feature value calculation parts 530 to 532. Thus, the classification which is also based on the autocorrelation feature value obtained from the defect candidate image is performed in the classifying part 54. As a result, in the pattern inspection apparatus 1 with the operation part 50b, it is possible to classify classes of defect candidates with high accuracy.

Figure 11:
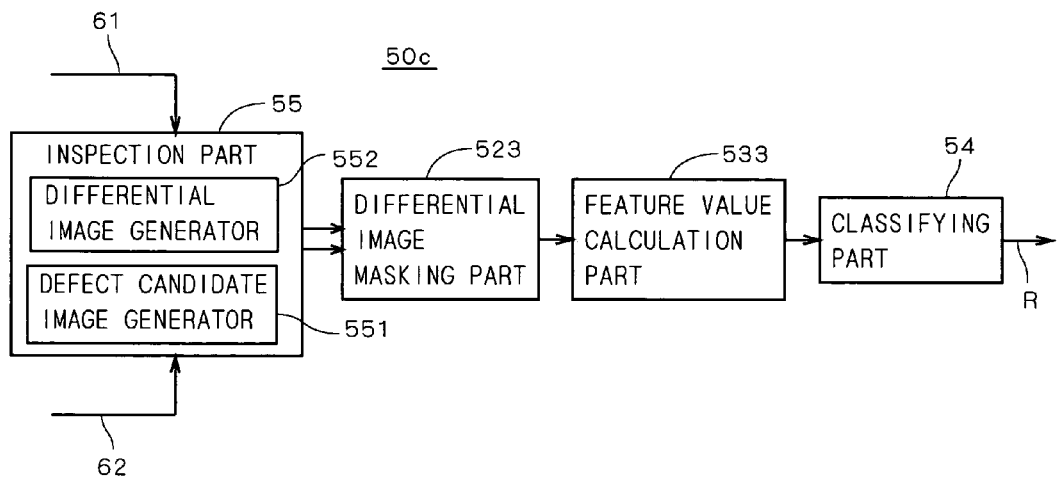
FIG. 11 is a block diagram showing a structure of an operation part in accordance with a second preferred embodiment.

FIG. 11 is a block diagram showing a structure of an operation part 50c of the pattern inspection apparatus 1 in accordance with the second preferred embodiment of the present invention. The operation part 50c of FIG. 11 comprises an inspection part 55 and the inspection part 55 comprises the same defect candidate image generator 551 as the defect candidate image generator 511 of FIG. 3 and a differential image generator 552 for generating a differential image. The operation part 50c further comprises a differential image masking part 523 to which a differential image is inputted and a feature value calculation part 533 to which a masked differential image is inputted.

Figure 12:
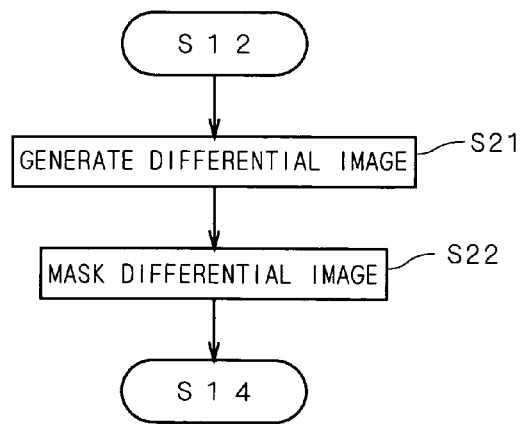
FIG. 12 is a flowchart showing an operation flow for inspecting pattern on a substrate.

FIG. 12 is a flowchart showing an operation flow of the pattern inspection apparatus 1 with the operation part 50c for inspecting pattern on a substrate 9 and the operation is performed instead of Step 13 of FIG. 4. In the pattern inspection apparatus 1, after a grayscale inspection image representing pattern on the substrate 9 and a grayscale reference image(s) are acquired (FIG. 4: Step S11), in the defect candidate image generator 551 a defect candidate image representing defect candidate areas (or a defect candidate area) in the inspection image is generated by comparing the inspection image with the reference image (Step S12) and at the same time in the differential image generator 552 an differential image between the inspection image and the reference image is generated (Step S21). Actually, as described in the first preferred embodiment, in generating the defect candidate image, the first image and the second image which are the simple differential images are generated, and any of these images serve as the differential image generated in Step S21. Thus, in the inspection part 55 in the second preferred embodiment, it is not needed to distinguish each function of the defect candidate image generator 551 and the differential image generator 552 clearly.

The differential image and the defect candidate image are inputted to the differential image masking part 523 and masked with the candidate defect image (Step S22). In other words, the differential image in which areas other than the defect candidate area(s) are masked is generated. In the feature value calculation part 533, an autocorrelation feature value of each defect candidate area is obtained from the masked differential image (Step S14), the autocorrelation feature value(s) is outputted to the classifying part 54. At this time, other type(s) of feature value(s) such as geometric feature value, feature value representing density may be further obtained. Then, the autocorrelation feature value is inputted to the classifier 541 constructed by learning performed in the classifier construction part 542 in advance (refer to FIG. 3), and the signal R representing the classification result is outputted by the classifier 541, the defect candidate(s) included in the defect candidate area(s) 7 is classified.

As discussed above, in the pattern inspection apparatus 1 with the operation part 50c of FIG. 11, the simple differential image which represents the difference of density information between the inspection image and the reference image is generated and the classification of the defect candidate is performed on the basis of the autocorrelation feature value obtained from the simple differential image which is masked with the defect candidate image. Generally, a simple differential image is an image which represents geometric feature of defect candidate in defect candidate area directly, however, when defect candidate is not clear, textured or the like in a simple differential image, even if geometric feature value or feature value representing density is obtained from the simple differential image, it is hard to perform a classification of defect candidate with high accuracy. Conversely, in the pattern inspection apparatus 1, since an autocorrelation feature value is obtained from the simple differential image, it is possible to classify a class of defect candidate with high accuracy. Since the classifying part 54 comprises the classifier construction part 542 for constructing the classifier 541 by learning which outputs a classification result in accordance with the autocorrelation feature value, it is possible to perform the high accurate classification of defect candidate by using the autocorrelation feature value easily.

The differential image generated in the differential image generator 552 may be an image other than the simple differential image between the inspection image and the reference image. For example, the differential image may be the error probability value image or the probability product image in the first preferred embodiment, an image representing the difference between two images which represent edge information generated from the inspection image and the reference image, respectively, or a derivative image of an image representing this difference, the error probability value image or the probability product image, or the like. In other words, a differential image representing a difference between the inspection image and the reference image or a difference between two images obtained from the inspection image and the reference image, respectively, or a differential image obtained from the image representing this difference is generated as a image from which the autocorrelation feature value is extracted in the differential image generator 522 by using various methods.

In inspecting pattern, since the inspection image and the reference image are acquired and the differential image is generated on the basis of these images, even if density of an acquired image changes by change over time of light intensity of the illumination light emitted from the lighting part 31 (refer to FIG. 1) or the like, it becomes possible to perform a robust classification. According to methods for generating the differential image and the defect candidate image, whichever image may be generated first.

Figure 13:
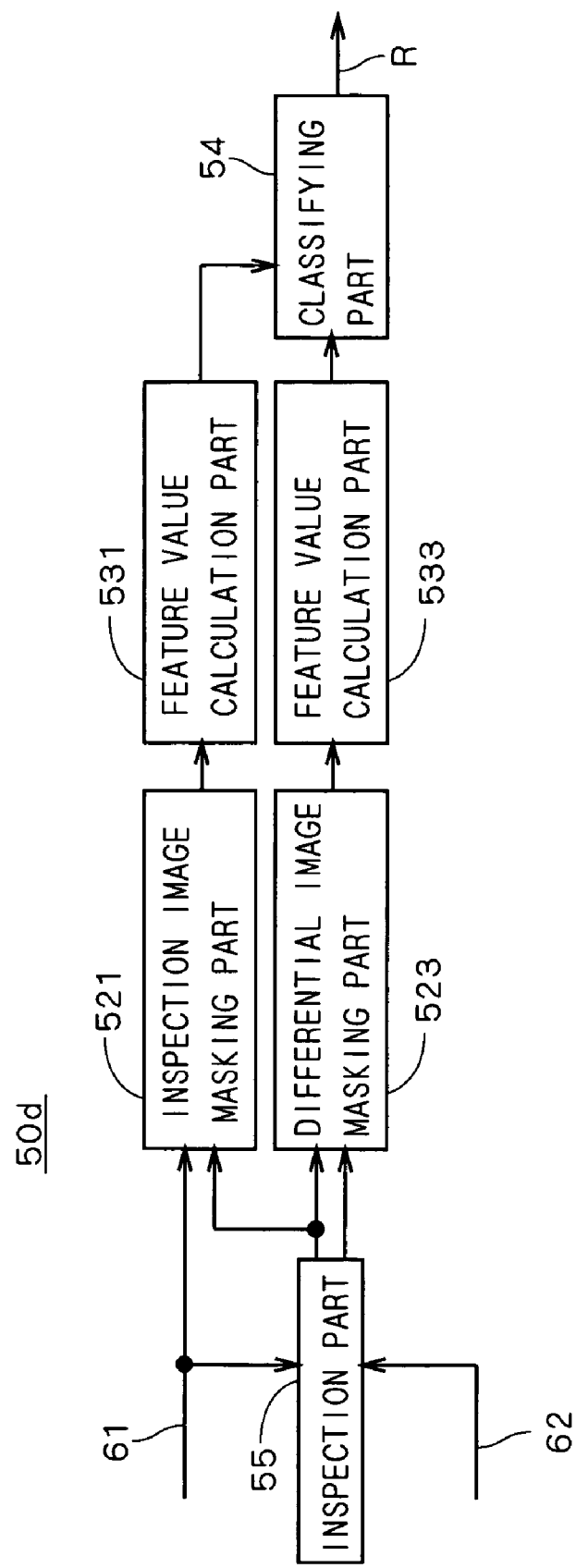
FIG. 13 is a block diagram showing another exemplary structure of an operation part.

FIG. 13 is a block diagram showing another exemplary structure of an operation part. An operation part 50d of FIG. 13 is a part added the inspection image masking part 521 and the feature value calculation part 531 in the operation part 50 of FIG. 3 to the operation part 50c of FIG. 11. In the operation of the operation part 50d, the operation of FIG. 12 is performed between Step S12 and Step S13 of FIG. 4.

In inspecting pattern of the pattern inspection apparatus 1 with the operation part 50d of FIG. 13, concurrently with masking the differential image (FIG. 12: Step S22), in the inspection image masking part 521 the inspection image is masked with the defect candidate image to obtain a masked inspection image (FIG. 4: Step S13), and autocorrelation feature values of each defect candidate area are obtained from the masked differential image and the masked inspection image, respectively (Step S14). In the classifying part 54, a classification of defect candidate is performed, and the classification is also based on the autocorrelation feature value obtained from the masked inspection image in addition to the autocorrelation feature value obtained from the masked differential image. As a result, in the pattern inspection apparatus 1 with the operation part 50d, it is possible to classify classes of defect candidates with high accuracy.

Figure 14:
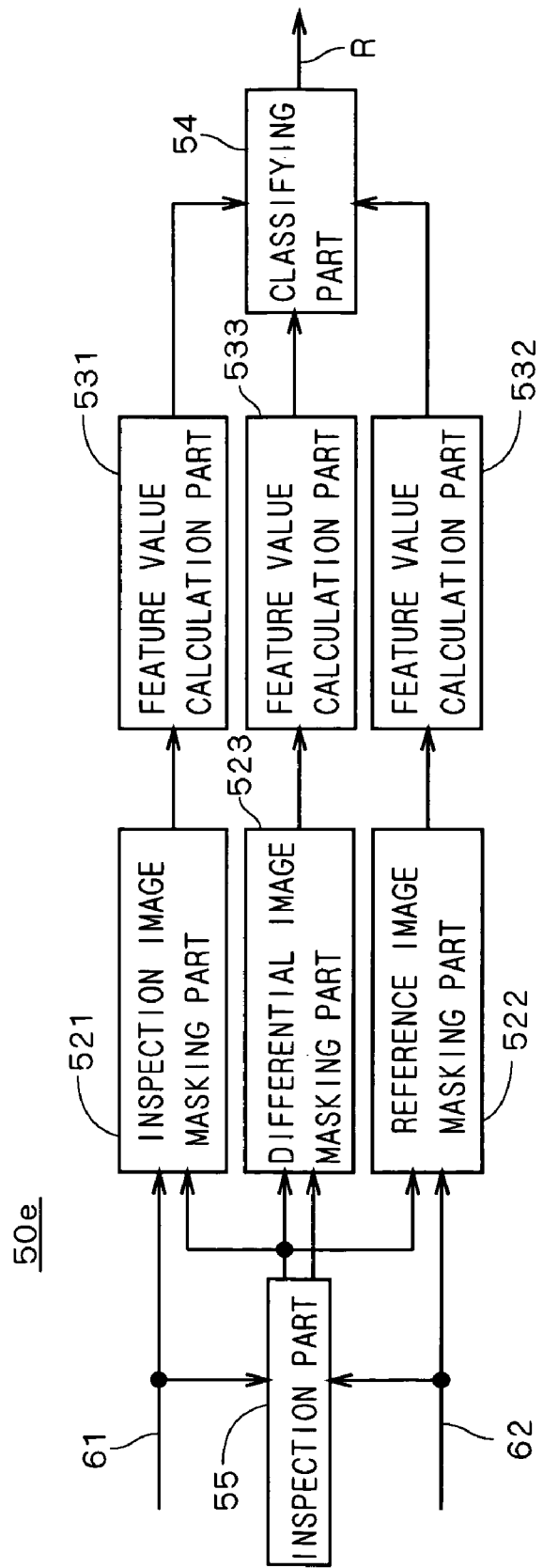
FIG. 14 is a block diagram showing still another exemplary structure of an operation part.

FIG. 14 is a block diagram showing still another exemplary structure of an operation part. An operation part 50e of FIG. 14 is a part added the reference image masking part 522 and the feature value calculation part 532 in the operation part 50a of FIG. 8 to the operation part 50d of FIG. 13. In the operation of the operation part 50e, the operation of FIG. 12 is performed between Step S12 and Step S13 of FIG. 4 and the operation of FIG. 9 is performed between Step S13 and Step S14 of FIG. 4.

In the pattern inspection apparatus 1 with the operation part 50e of FIG. 14, the differential image, the inspection image and the reference image are masked with the defect candidate image in the differential image masking part 523, the inspection image masking part 521 and the reference image masking part 522, respectively (FIG. 12: Step S22, FIG. 4: Step S13, FIG. 9: Step S13*a*) to obtain a masked differential image, a masked inspection image and a masked reference image, and autocorrelation feature values of each defect candidate area are obtained from the masked differential image, the masked inspection image and the masked reference image, respectively (FIG. 4: Step S14). In the classifying part 54, a classification of defect candidate is performed on the basis of the autocorrelation feature value obtained from the masked reference image in addition to the autocorrelation feature values obtained from the masked differential image and the masked inspection image. It is therefore possible to classify classes of defect candidates with high accuracy.

Figure 15:
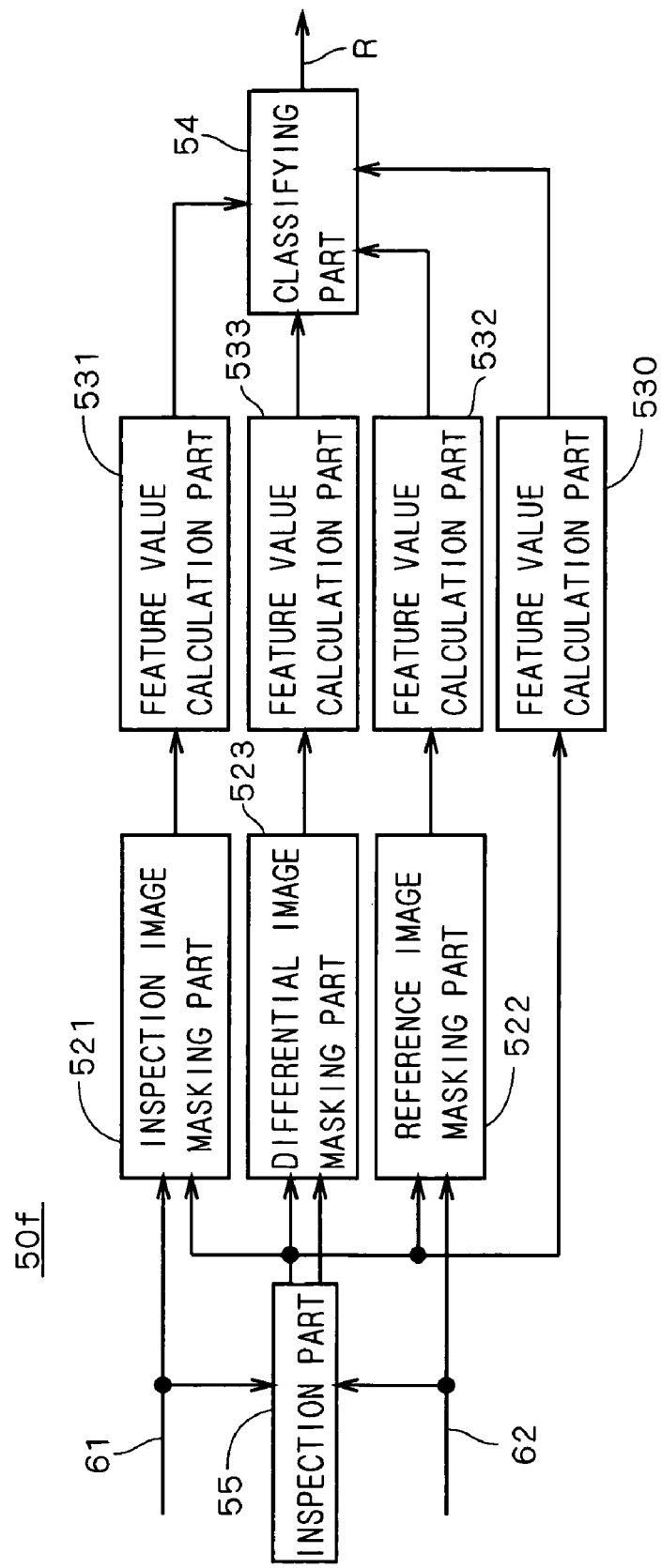
FIG. 15 is a block diagram showing still another exemplary structure of an operation part.

FIG. 15 is a block diagram showing still another exemplary structure of an operation part 50*f*. An operation part 50*f* of FIG. 15 is a part added the feature value calculation part 530 in the operation part 50*b* of FIG. 10 to the operation part 50*e* of FIG. 14 and an autocorrelation feature value of the defect candidate image is further obtained. The autocorrelation feature values of each defect candidate area obtained from the masked differential image, the masked inspection image, the masked reference image and the defect candidate image, respectively, are inputted to the classifying part 54 in the operation part 50*f* of FIG. 15, it is therefore possible to classify classes of defect candidates with high accuracy.

Though the preferred embodiment of the present invention has been discussed above, the present invention is not limited to the above-discussed preferred embodiment, but allows various variations.

In the second preferred embodiment, if the autocorrelation feature value extracted from the differential image is obtained as low-dimensional vector (i.e., only a few autocorrelation matrixes are used), the classification of defect candidate may be performed on a rule base.

While the autocorrelation matrix in which the elements are arranged in 3×3 is used in the preferred embodiments, by using an autocorrelation matrix representing large area in which elements are arranged in 5×5, 9×9 or the like, high-level texture analysis or the like may be performed. In this case, it is preferable to enlarge a defect candidate area where a feature value is extracted by performing a larger dilation or the like on the defect candidate area in the operation of the inspection part.

In a plurality of divided areas obtained by dividing a defect candidate image, the whole divided area including defect candidates specified by the operation of the inspection part may be served as a defect candidate area.

The functions of the operation part in the pattern inspection apparatus may be added to a defect reviewing apparatus which picks up images of defects inspected by other inspecting apparatus or the like and confirms defects. In this case, for example, an image picked up by the defect reviewing apparatus is served as an inspection image and a classification of a defect is performed on the basis of the inspection image.

In the preferred embodiment, the inspection is performed to pattern formed on a semiconductor substrate, but the pattern inspection apparatus can be utilized to inspect pattern formed on, for example, a printed circuit board, a glass substrate for manufacturing a flat panel display or the like. An object inspected by the pattern inspection apparatus may, be something other than the substrate.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2004-283003 filed in the Japan Patent Office on Sep. 29, 2004, the entire disclosure of which is incorporated herein by reference.

What is claimed is:

1. An apparatus for inspecting a pattern on an object, comprising:
   a defect candidate image generator for generating a defect candidate image representing an area which includes a defect candidate in a grayscale inspection image representing pattern on an object by comparing said inspection image with a reference image;
   an inspection image masking part for masking said inspection image with said defect candidate image to obtain a masked inspection image;
   a reference image masking part for masking said reference image with said defect candidate image to obtain a masked reference image;
   a feature value calculation part for obtaining an autocorrelation feature value from each of said masked inspection image and said masked reference image, each of said autocorrelation feature values being obtained as a high-dimensional vector of which values of elements are obtained by using a plurality of autocorrelation matrices; and
   a classifying part for performing a classification of said defect candidate on the basis of said autocorrelation feature values, wherein
   said classifying part comprises a classifier construction part for constructing a classifier by learning which outputs a classification result in accordance with said autocorrelation feature values.

2. The apparatus according to claim 1, wherein
   said classification is also based on an autocorrelation feature value obtained from said defect candidate image.

3. A method for inspecting a pattern on an object, comprising the steps of:
   a) generating a defect candidate image representing an area which includes a defect candidate in a grayscale inspection image representing pattern on an object by comparing said inspection image with a reference image;
   b) masking said inspection image with said defect candidate image to obtain a masked inspection image;
   c) masking said reference image with said defect candidate image to obtain a masked reference image;
   d) obtaining an autocorrelation feature value from each of said masked inspection image and said masked reference image, each of said autocorrelation feature values being obtained as a high-dimensional vector of which values of elements are obtained by using a plurality of autocorrelation matrices; and
   e) performing a classification of said defect candidate on the basis of said autocorrelation feature values, wherein
   said classification is performed by a classifier constructed by learning which outputs a classification result in accordance with said autocorrelation feature values, and
   the above steps are performed by a computer.

4. The method according to claim 3, wherein
   said classification is also based on an autocorrelation feature value obtained from said defect candidate image.

* * * * *